United States Patent
Huang et al.

(10) Patent No.: US 8,169,993 B2
(45) Date of Patent: May 1, 2012

(54) METHOD AND APPARATUS TO ESTIMATE WIRELESS BASE STATION SIGNAL QUALITY OVER THE AIR

(75) Inventors: Kee-dyi Huang, Cupertino, CA (US); Maximilian Maung, Daly City, CA (US); Bernard Justus Olshausen, Sammamish, WA (US); Jeffrey Abramson Heath, Jericho, NY (US); Derek Truesdale, San Jose, CA (US)

(73) Assignee: Anritsu Company, Morgan Hill, CA (US)

( * ) Notice: Subject to any disclaimer, the term of this patent is extended or adjusted under 35 U.S.C. 154(b) by 890 days.

(21) Appl. No.: 12/104,269

(22) Filed: Apr. 16, 2008

(65) Prior Publication Data

US 2009/0264080 A1     Oct. 22, 2009

(51) Int. Cl.
*H04J 1/00*      (2006.01)
(52) U.S. Cl. ....................................................... 370/343
(58) Field of Classification Search .......... 370/203–208, 370/212–215, 252, 338, 350, 465; 455/67.13, 455/67.11, 277.1, 277.2, 65; 375/224, 295
See application file for complete search history.

(56) References Cited

U.S. PATENT DOCUMENTS

| | | | |
|---|---|---|---|
| 6,922,388 B1 * | 7/2005 | Laroia et al. | 370/208 |
| 2002/0168020 A1 * | 11/2002 | Justice et al. | 375/295 |
| 2006/0209881 A1 * | 9/2006 | Howard | 370/465 |
| 2008/0266160 A1 * | 10/2008 | Goodall et al. | 341/155 |
| 2009/0003308 A1 * | 1/2009 | Baxley et al. | 370/350 |

* cited by examiner

*Primary Examiner* — Kwang B Yao
*Assistant Examiner* — Jung-Jen Liu
(74) *Attorney, Agent, or Firm* — Fliesler Meyer LLP (57) ABSTRACT

The quality of the signal from a base station is measured and adjusted for distortion due to multipath and due to signals from neighboring co-channel base stations. The signal quality is measured conventionally by determining Rho or EVM and then Rho or EVM are adjusted. To adjust the signal the process includes the steps of: (a) sampling a received CDMA base station signal in a particular frequency channel, calculating the total received power to provide a reference value for subsequent normalization; (b) demodulating the received signal and constructing an ideal reference signal; (c) correlating between the ideal reference signal and received signal to determine a Rho value, or calculating the ratio of the difference between ideal and received signal to the ideal signal to obtain EVM; (d) performing a self cross correlation to separate signals from the sampled received signal on different delay paths, and determining a multipath power value x as a total power of signals on non-dominant ones of the delay paths; (e) performing a code correlation pilot scan of the sampled signal to determine strengths of signals from neighboring co-channel base stations; (f) summing the power levels of the neighboring co-channel base station signals to provide a total pilot pollution power y; and (g) calculating an adjusted Rho or EVM by removing x and y from the total received power.

4 Claims, 6 Drawing Sheets

METHOD AND APPARATUS TO ESTIMATE WIRELESS BASE STATION SIGNAL QUALITY OVER THE AIR

BACKGROUND

1. Technical Field

The present invention relates to measurement instruments that determine the quality of a modulated signal from a base station in the presence of distortion. More particularly, the present invention relates to method for a test instrument to determine the quality of a signal transmitted by a base station that uses Code Division Multiple Access (CDMA) based technology in the presence of multi-path and co-channel interference.

2. Related Art

There are several products on the market today designed to measure over-the-air wireless signal quality. These products currently include the Anritsu MT8212B, MT8220A, MT8222A, MS2721B, MS2723B, and MS2724B, all available from Anritsu of Morgan Hill, Calif. Additional products currently available include the Tektronix NetTek Analyzer and the Agilent E7495B. At least some of these wireless measurement instruments provide a standard quality indicator for a modulated signal in terms of error vector magnitude (EVM), or the ratio of the ideal modulated power to the total received power (Rho). However, neither determination of EVM or Rho can determine if distortion comes from the signal transmitter itself or the transmission path.

Hence, to know the true health of a base station transmitter, technicians often have to climb up a tower for a direct cable connection or move around on the ground for a location with minimal over-the-air distortion. The former is inefficient and dangerous, while the latter is dependent on one's experience level and luck.

Thus, it is desirable to provide a method for measuring the quality of a base station transmitter while minimizing the effect of distortion without requiring the technician to move around for a minimal distortion location.

SUMMARY

According to embodiments of the present invention, a method is provided to determine the quality of the signal from a base station by adjusting the measured signal quality to account for distortion. In particular, the present invention removes the effect of distortion caused by multipath signals or by signals from neighboring co-channel base stations.

In one embodiment of the present invention Rho is determined from a CDMA based signal of a base station and then adjusted to account for distortion. A CDMA based signal used herein includes CDMA based technologies that can be for example WCDMA, TD-SCDMA, IS95, 1xRTT and EVDO, as distinguished from a non-CDMA wireless signal standard. The Rho measurement and the steps for adjusting the value of Rho to account for distortion according to embodiments of the present invention include the following steps:

(a) sampling a received CDMA base station signal in a particular frequency channel, calculating its power (the total received power) and using it as a reference value to normalize powers calculated in subsequent steps;

(b) demodulating the received signal after frequency and timing error correction and constructing an ideal reference signal by modulating and pulse shaping the demodulated bits;

(c) correlating between the ideal reference signal and received signal to determine a Rho value as a ratio of the modulated ideal signal power to total received signal power;

(d) performing a self-cross correlation to separate signals from the sampled received signal on different delay paths, determining a multipath power value x as a total power of signals on non-dominant ones of the delay paths separated from the sampled CDMA signal, and normalizing the x value with respect to the reference power determined in step (a); and (e) performing a code correlation pilot scan of the sampled signal to determine strengths of signals from neighboring co-channel base stations; their effect on the primary base station signal is called pilot pollution. (Note for this step that code correlation is typically only performed on CDMA-based technologies. Thus, embodiments of the present invention are directed to CDMA-based signals, rather than non-CDMA signals.) (Further note that steps of the present invention embodiments are performed under the assumption that pilot power as a percentage of total channel power does not differ much from base station to base station, so the total powers of signals from various interfering base stations can be estimated from the code correlation pilot scan.)

(f) summing the power levels of the neighboring co-channel base station signals to provide a total pilot pollution power y, and normalizing y with respect to the total power determined in step (a); and (g) calculating an adjusted Rho using the relation measured Rho/(1−x−y).

These steps, thus, remove the effect of distortion due to multipath and pilot pollution since the total received power equals the main path power+multipath power x+pilot pollution power y, and x and y can be subtracted out.

The method described assumes a linear relationship between the undistorted base station signal and the distortion due to multipath and co-channel neighboring base station signals. This assumption is applicable as long as distortion is not unusually large. Embodiments of the present invention, thus, reduce the effect of multipath and co-channel interference in determining Rho but cannot totally remove it.

In the case of severe signal distortion, even the industry-standard (unadjusted by embodiments of this invention) Rho cannot be a reliable signal quality indicator because of the difficulty in reconstructing the ideal reference signal in step (b). In summary, for signals without severe distortion embodiments of this invention extend the usability of Rho while maintaining similar validity conditions to the original metrics.

Although an adjusted value for Rho is determined using the steps above, in alternative embodiments of the present invention, similar steps may be provided to create an adjusted value for EVM or Code Domain Noise Floor measurements. The EVM and Code Domain Noise Floor determinations use the reference and ideal signals of steps (a) and (b) but use a different formula in step (c).

BRIEF DESCRIPTION OF THE DRAWINGS

Further details of the present invention are explained with the help of the attached drawings in which.

DETAILED DESCRIPTION

Figure 1:
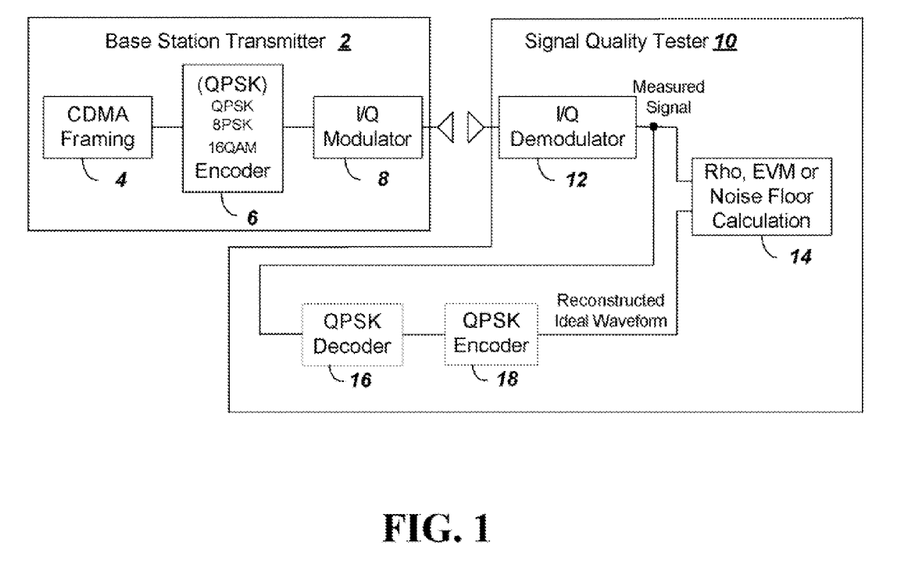
FIG. 1 shows a simplified block diagram of a test system configuration for determining signal quality of a base station using Rho, EVM or Code Domain Noise Floor.

Embodiments of the present invention provide an adjusted value for Rho, EVM or Code Domain Noise Floor. FIG. 1 shows a simplified block diagram of a test system configuration for determining signal quality of a base station using Rho, EVM or Code Domain Noise Floor. The system includes a CDMA framing module 4 providing a CDMA based signal for transmission. The CDMA based signal from module 4 is provided through a quadrature phase shift key (QPSK) encoder 6. The QPSK type is shown in parenthesis to illustrate that other types of modulation such as 8PSK or 16QAM can likewise be used to modulate the CDMA signal. For convenience the term QPSK will be used for QPSK encoders or QPSK decoders, although other types of encoding and decoding can be used. The output of the QPSK encoder 6 is provided through an I/Q modulator 8, which transmits a modulated signal over an antenna to the signal quality tester 10.

The signal quality tester 10 includes a I/Q demodulator 12, which is an I/Q recovery device. The output of the I/Q demodulator 12 provides a received CDMA based signal to a Rho, EVM or Code Domain Noise Floor calculation module 14. The Rho, EVM or Code Domain Noise Floor calculation module 14 further receives an ideal signal provided to its second input and uses these signals to determine Rho, EVM or Noise Floor values. The steps for determining Rho, EVM or Noise Floor, as well as steps in accordance with embodiments of the present invention to determine an adjusted Rho, EVM or Noise Floor are described in more detail subsequently.

The total received power measured from I/Q recovery device 12 can be conventionally defined as the sum of the main path power from the base station 2, along with multipath power, and pilot pollution power from neighboring base stations. A determination of Rho or EVM using the Rho or EVM calculation module 14 will, thus, be distorted by the multipath and pilot pollution from neighboring stations. Accordingly, embodiments of the present invention take steps to eliminate effects due to multipath and pilot pollution on Rho or EVM or other similar signal quality metrics such as Code Domain Noise Floor.

Figure 2:
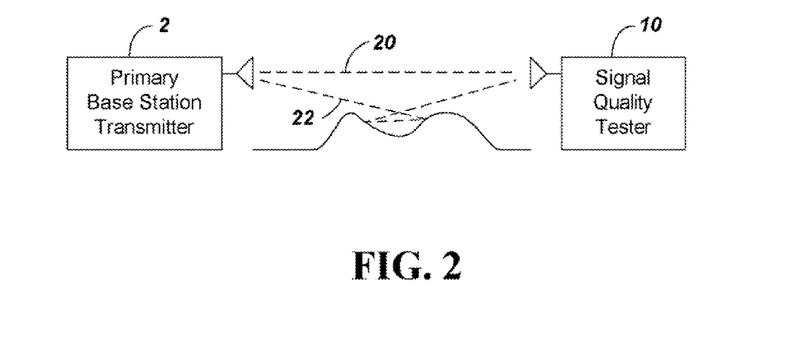
FIG. 2 illustrates creation of multipath in the signal from base station 2.

FIG. 2 illustrates creation of multipath in the signal from base station 2. As shown, the base station 2 transmits a dominant path signal 20 to the signal quality tester 10. The multipath is created on signal path 22 that reflects from ground objects that is also received by tester 10. The total received power shown from FIG. 2, thus, includes both the power from the dominant path signal 20 and the power of the multipath distortion signal 22.

Figure 3:
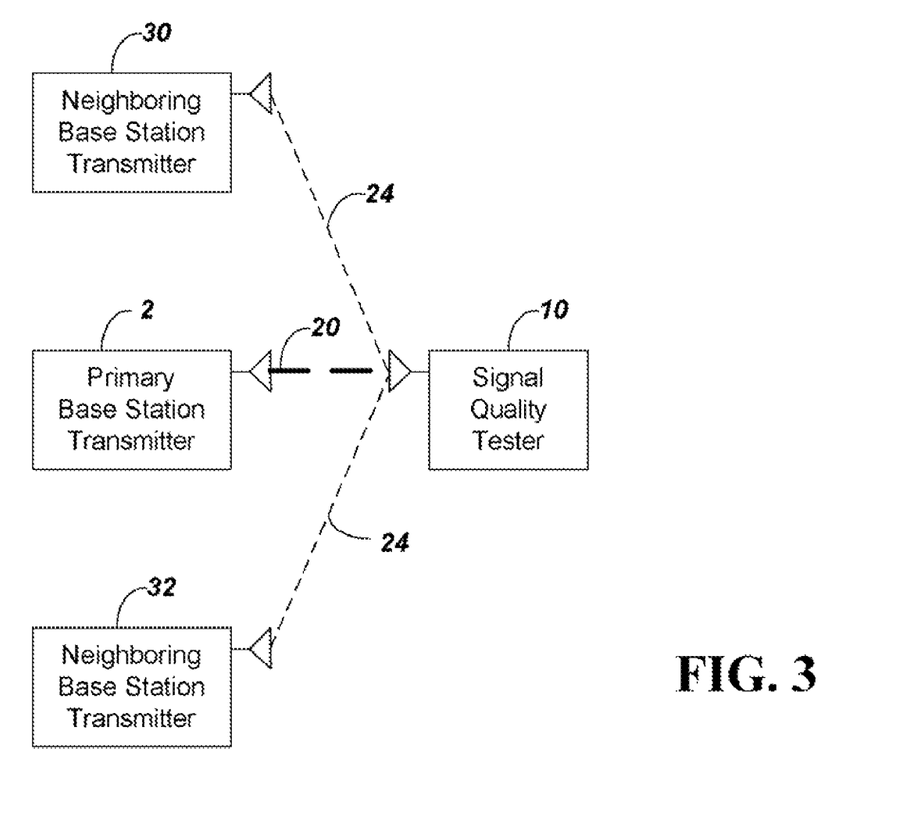
FIG. 3 illustrates creation of distortion due to neighboring co-channel base stations.

FIG. 3 illustrates creation of distortion due to neighboring co-channel base stations 30 and 32. Like in FIG. 2, the base station 2 transmits over the dominant path 20 to signal quality tester 10. The neighboring base stations operate on the same channel to enable handoff of mobile stations that travel between the base stations. The neighboring co-channel base stations thus provide lower power signal components 24 to the signal quality tester 10.

Figure 4:
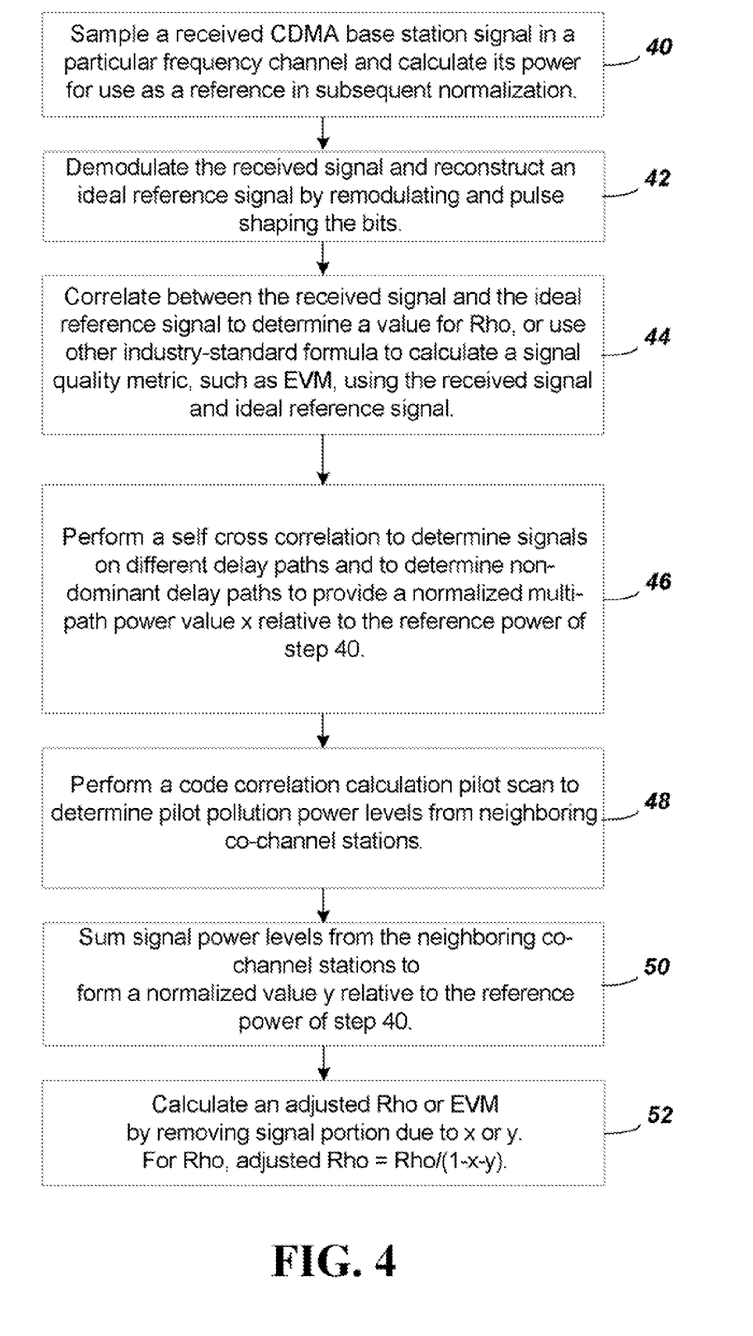
FIG. 4 is a flow chart showing steps for determining signal quality of a base station by measuring Rho or EVM along with determining an adjusted Rho or EVM to account for both multipath and neighboring co-channel signals.

Embodiments of the present invention provide an adjustment to measured signal quality to account for the effect of multipath, as shown in FIG. 2, and for the effect of signals from neighboring co-channel base stations, as shown in FIG. 3. An adjusted value of signal quality is determined according to the present invention for measurements made using Rho, EVM and or other signal quality measures such as Code Domain Noise Floor. FIG. 4 is a flow chart showing steps for determining signal quality of a base station by measuring Rho or EVM along with determining an adjusted Rho to account for both multipath and neighboring co-channel signals. First in step 40 a CDMA based signal in a particular frequency channel is received by the quality tester, such as tester 10. The calculated signal power, which is the total received power, will be used as the reference value for normalization in subsequent steps. Note again for step 40 that code correlation used in later steps will typically only be performed on CDMA-based technologies. Thus, embodiments of the present invention are directed to CDMA-based signals, rather than non-CDMA signals. The CDMA based signals can, for example, include WCDMA, TD-SCDMA, 1xRTT and EVDO.

Next in step 42 the received CDMA based signal is demodulated and reconstructed to create an ideal reference signal by remodeling and pulse shaping the bits. Note that the demodulation and reconstruction is almost entirely dependent on what is transmitted by the primary base station on the dominant transmission path. Next in step 44, a correlation is performed between the received signal and the ideal reference signal according to industry defined conventional methods to determine Rho. Likewise, EVM can be calculated using industry defined formula, essentially calculating the ratio of magnitude of the difference between ideal and received signal, to the magnitude of the ideal signal. Typically Rho can be perceived as a ratio of the correctly modulated ideal signal power to the total received signal power. Also note that the value for EVM can be approximately derived from Rho as EVM=square root of (1/Rho−1).

Next in step 46, a self cross-correlation is performed on the same CDMA signal and strengths of the signals coming from various delay paths are obtained. Performing the cross-correlation enables separate measurement of the signal powers on the separate delay paths, which are used in the signal quality determination process. The non-dominant power level delay paths are separated out. These non-dominant delay paths are the multipath signals illustrated by signals 22 in FIG. 2. For reference in further calculations, the total power of these non-dominant multi-path signals will be set as a value x. The value x will be normalized with respect to the reference power determined in step 40.

Next in step 48 a pilot scan, or signal code correlation calculation, is performed to estimate the relative strengths of signals from all neighboring co-channel base stations. The pilot scan enables separation of the signal 20 of primary station 2 from the signals 24 of the neighboring base stations 30 and 32 as shown in FIG. 3. Code correlation enables separation of the signals on the same channel transmitted using CDMA based technology. Other non-CDMA techniques are not used. For reference in further calculations, the sum of relative powers from these neighboring base stations, or total pilot pollution, are given a value y in step 50. The value y will be normalized with respect to the reference power determined in step 40.

To calculate an adjusted Rho value in step 52, the following formulas are used:

(1) Measured Rho=correctly modulated main path power/ total received power; and (2) Total received power=main path power+multipath power x+pilot pollution power y.

To adjust the value for Rho according to embodiments of the present invention, with the main signal levels above a certain threshold, the effect of multipath and pilot pollution on Rho can be assumed to be linear and removed. Removing multipath and pilot pollution from Rho will provide a better overall estimate of health of a base station transmitter. Thus, in step 52, adjusted Rho is approximated by the following relation:

Adjusted Rho=measured Rho/(1−x−y)

For good quality measurements, received signal should be well above an instrument's noise floor. Pilot pollution and multipath also have to be below some thresholds for the linearity assumption to hold. The embodiment described above automates the qualification process and performs a moving average on all relevant measurement results to further simplify the complexity in base station maintenance.

Although Rho is used to determine signal quality from a base station in the above embodiments, similar steps are applied to create "Adjusted EVM" and "Adjusted Noise Floor", with the same benefit as "Adjusted Rho." This is true because all CDMA based systems have multipath and pilot pollution as the main source of distortion.

Figure 5:
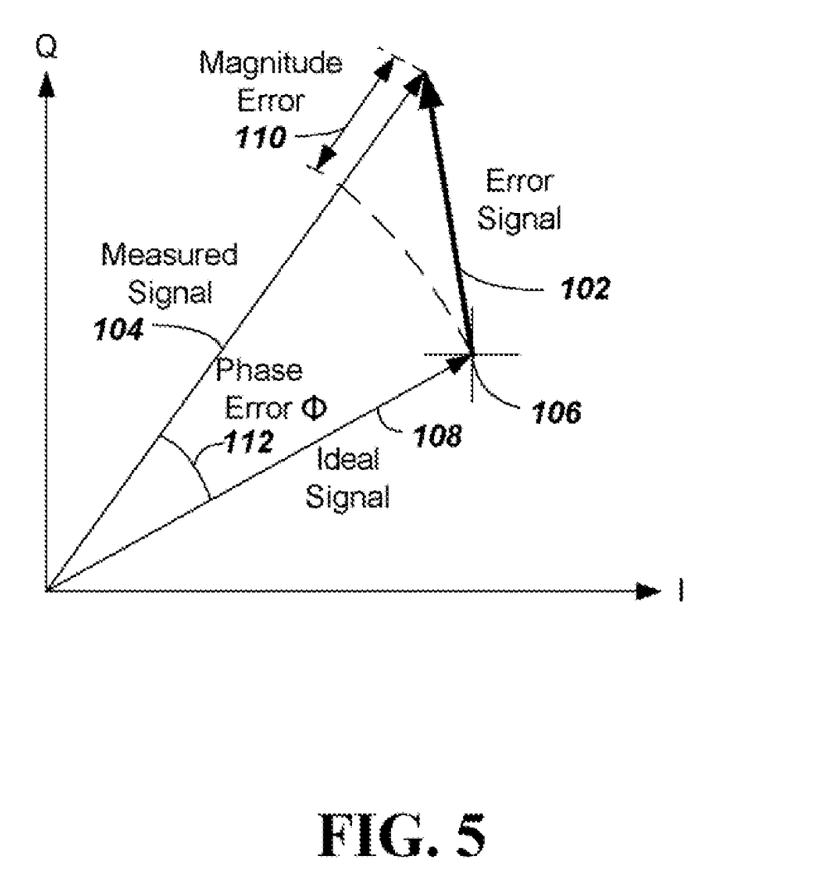
FIG. 5 shows signal vectors for determining EVM.

The measurement for EVM is similar to the measurement for Rho. FIG. 5 shows signal vectors used in a conventional process for determining EVM. EVM is determined from the signals illustrated by calculating a RMS magnitude of an error vector 102 and expressing this RMS error value as a percentage of the measured signal magnitude 104. The measured signal power magnitude 104 is determined, similar to that for Rho, by measuring the power of the entire signal received by the signal quality tester including multipath and pilot pollution. An ideal or perfect reference signal vector 108 is synthesized by demodulating the received signal to symbols and then remodulating the signals. The error vector 102 is then identified from the vertex of the ideal signal 108 to the end of the measured signal 104. The error vector 102 includes a magnitude portion 110 and a phase portion 112, as further shown in FIG. 5.

Since the effect of multipath and pilot pollution on magnitude is less linear than the effect on power, the following formula is adopted for EVM:

Adjusted EVM=EVM−Alpha*sqrt(x+y)

where Alpha is an experimentally determined constant, typically less than 1. The exact value of Alpha depends on the over-the-air transmission condition.

Alternatively, an approximate Rho-EVM conversion formula can be used to obtain an adjusted EVM based on adjusted Rho as follows:

Adjusted EVM=square root of(1/Adjusted Rho−1).

Like with Rho and EVM, adjustments can be made using another embodiment of the present invention to determine Code Domain Noise Floor (NF) as a measurement of signal quality. The formula is as follows:

Adjusted NF=(NF*Orthogonal Code Spreading Factor−(x+y))/(1−(x+y))/Orthogonal Code Spreading Factor Logarithmic conversion needs to be done if noise floor is expressed in dB instead of normalized power. For example, if NF is −30 dB, spreading factor is 64, x is 0.01, and y is 0.01, then adjusted NF in dB will be determined as follows:

$$= 10*\log 10((10^{\wedge}(-30/10))*$$
$$64 - 0.01 - 0.01)/(1 - 0.01 - 0.01)/64)$$
$$= -31.5\,\mathrm{dB}$$

Figure 6:
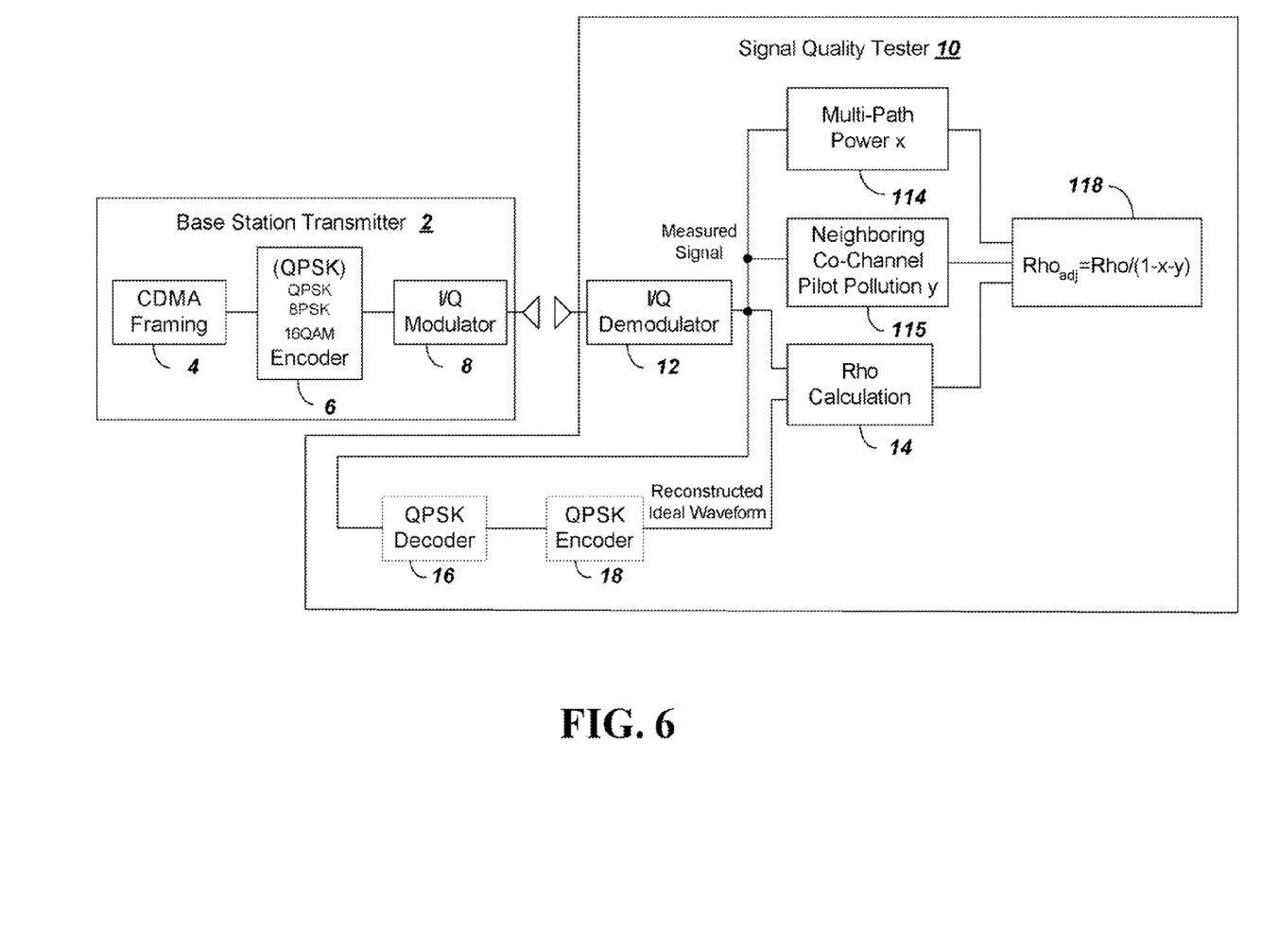
FIG. 6 shows details of components that may be added to a test system of FIG. 1 for determining signal quality according to embodiments of the present invention.

FIG. 6 shows details of components that may be added to the test system of FIG. 1 to determine signal quality according to embodiments of the present invention. Components carried over from FIG. 1 are similarly labeled in FIG. 6, as will be components carried over into subsequent drawings. Carried over components described with respect to FIG. 1 will not be further described in FIG. 6.

FIG. 6 modifies FIG. 1 initially by adding a module 114 for determining multipath power and a module 115 to determine neighboring co-channel pilot pollution y. The multipath module 114 receives the measured signal from demodulator 12 and uses it to perform a self-cross correlation to determine signals on different delay paths as described in step 46 of FIG. 4. The multipath module 114 continues to provide a multipath power value from the delay paths that is normalized relative to total power as further described in step 46.

The pilot pollution module 115 also receives the measured signal from demodulator 12 and performs a pilot code correlation calculation to determine pilot pollution from neighboring co-channel stations as described with respect to step 48 of FIG. 4. The pilot pollution module 115 then sums the signal power levels from neighboring co-channel stations to form a normalized value y as described with respect to step 50.

Another added module 118 provided an adjusted Rho value $\mathrm{Rho}_{adj}$. The adjusted Rho module 118 receives the Rho determination from Rho calculation module 14, the x value from multipath module 114, and the y value from the pilot pollution module 115. The adjusted Rho module then calculates the adjusted Rho value using the formula $\mathrm{Rho}_{adj}$=Rho/(1−x−y) as described in step 52 of FIG. 4. Instead of Rho, modules 118 and 14 can be modified to determine an adjusted EVM or an adjusted Code Domain Noise Floor using calculations described previously.

Figure 7:
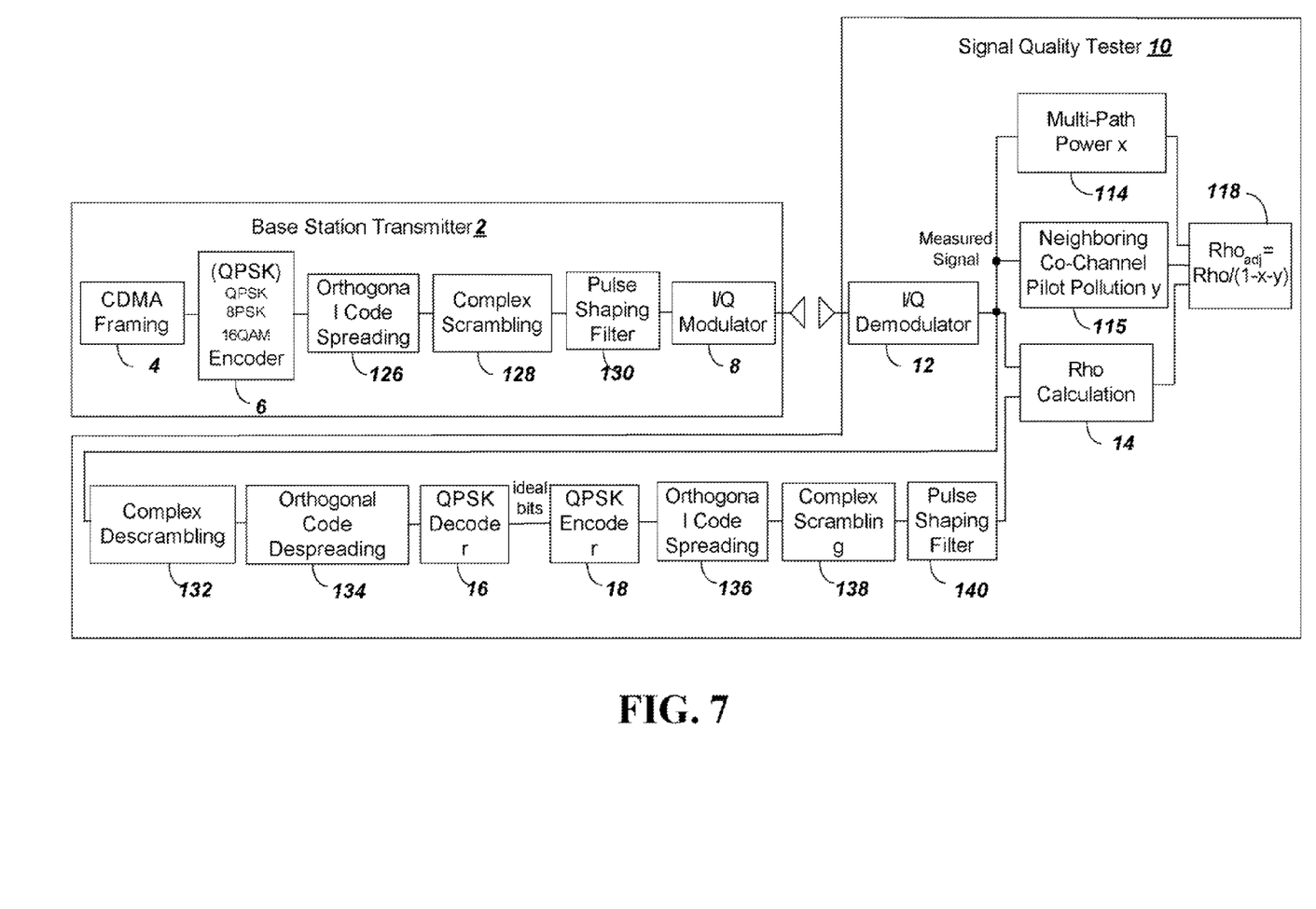
FIG. 7 shows components of a test system for determining signal quality in addition to those illustrated in FIG. 6.

FIG. 7 shows more components typically used in a system with a base station transmitter 2 and signal quality tester 10 that can be typically provided for generating Rho. Although additional components are shown, they are not necessary for modules 14, 114, 115 and 118 for determining an adjusted Rho in FIG. 7, and do not necessitate additional components in modules 14, 114, 115 and 118. Components carried over from FIG. 6 to FIG. 7 are described previously and for convenience will not be redescribed.

In FIG. 7, the base station transmitter 2 is modified to include an orthogonal code spreading module 126 following the QPSK encoder 6. Additionally prior to modulation in module 8 a complex scrambler 128 and pulse shaping filter 130 are provided.

With the additional modules in the base station transmitter 2, similar modules are likewise included in the signal quality tester 10. The signal quality tester 10 includes a complex descrambling module 132 receiving the output of the I/Q demodulator 12. Further, an orthogonal code despreading module 134 is provided prior to the QPSK decoder 16. After the QPSK encoder 18 that receives the now ideal signal, additional modules are provided including an orthogonal code spreader 136, a complex scrambler 138 and a pulse shaping filter 140.

Although the present invention has been described above with particularity, this was merely to teach one of ordinary skill in the art how to make and use the invention. Many additional modifications will fall within the scope of the invention, as that scope is defined by the following claims.

What is claimed:

1. A method for determining a quality of a signal transmitted by a base station comprising:
   sampling a received CDMA base station signal in a frequency channel of interest to provide a total received power;
   demodulating the received CDMA signal and constructing an ideal reference signal by modulating the demodulated received CDMA signal and creating a modulated ideal reference signal;
   correlating between the ideal reference signal and the received CDMA signal to determine a Rho value as a ratio of power of the modulated ideal reference signal to the total received signal power;
   performing a self cross correlation to separate signals from the received CDMA signal on different delay paths;
   determining a multipath power value x as a total power of signals on non-dominant ones of the delay paths from the received CDMA signal;
   performing a pilot code correlation pilot scan of the sampled signal to determine strengths of signals from neighboring co-channel base stations;
   summing the power levels of the neighboring co-channel base station signals to provide a total pilot pollution power y; and
   calculating an adjusted Rho ($Rho_{adj}$) using a relation $Rho_{adj} = Rho/(1-x-y)$.

2. The method of claim 1, wherein the sampled signal comprises the Code Division Multiple Access based signal including at least one of: IS95, 1xRTT, EVDO, WCDMA or TD-SCDMA.

3. A method for determining a quality of a signal transmitted by a base station comprising:
   sampling a received CDMA base station signal in a frequency channel of interest to provide a total received power;
   demodulating the received CDMA signal and constructing an ideal reference signal by modulating the demodulated received CDMA signal and determining an ideal reference signal;
   calculating the ratio of the magnitude of the difference between the ideal reference signal and the received CDMA signal, to the magnitude of the ideal signal to determine an EVM value;
   performing a self cross correlation to separate signals from the received CDMA signal on different delay paths;
   determining a multipath power value x as a total power of signals on non-dominant ones of the delay paths from the received CDMA signal;
   performing a Pilot code correlation pilot scan of the sampled signal to determine strengths of signals from neighboring co-channel base stations;
   summing the power levels of the neighboring co-channel base station signals to provide a total pilot pollution power y; and
   calculating an adjusted EVM by removing the effect of x and y from the determined EVM value, wherein the step of calculating the adjusted EVM is performed using a formula:

$$\text{Adjusted EVM} = \text{EVM} - \text{Alpha} * \text{square root}(x+y),$$

wherein Alpha is an experimentally determined constant less than 1.

4. A method for determining a quality of a signal transmitted by a base station comprising:
   sampling a received CDMA base station signal in a frequency channel of interest to provide a total received power;
   demodulating the received CDMA signal and constructing an ideal reference signal by modulating the demodulated received CDMA signal and determining an ideal reference signal;
   calculating the ratio of the magnitude of the difference between the ideal reference signal and the received CDMA signal, to the magnitude of the ideal signal to determine an EVM value;
   performing a self cross correlation to separate signals from the received CDMA signal on different delay paths;
   determining a multipath power value x as a total power of signals on non-dominant ones of the delay paths from the received CDMA signal;
   performing a Pilot code correlation pilot scan of the sampled signal to determine strengths of signals from neighboring co-channel base stations;
   summing the power levels of the neighboring co-channel base station signals to provide a total pilot pollution power y; and
   calculating an adjusted EVM by removing the effect of x and y from the determined EVM value, wherein the step of calculating the adjusted EVM is performed using the relation:

$$\text{Adjusted EVM} = \text{square root}(1/\text{Adjusted Rho} - 1),$$

wherein Adjusted Rho = $Rho/(1-x-y)$,
   wherein Rho is a ratio of a power of the ideal reference signal to the total received signal power.

* * * * *